United States Patent [19]
Kobayashi et al.

[11] Patent Number: 5,809,995
[45] Date of Patent: Sep. 22, 1998

[54] DEEP-FRYING APPARATUS WITH FOOD DEBRIS SHIELD

[75] Inventors: Toshihiro Kobayashi; Hideki Kijimoto, both of Nagoya, Japan

[73] Assignee: Paloma Industries, Ltd., Aichi, Japan

[21] Appl. No.: 890,240

[22] Filed: Jul. 9, 1997

[30] Foreign Application Priority Data

Aug. 9, 1996 [JP] Japan .................................. 8-227854

[51] Int. Cl.⁶ .................................................. A47A 27/00
[52] U.S. Cl. ............................................. 126/391; 99/403
[58] Field of Search ............................. 126/391; 99/403

[56] References Cited

U.S. PATENT DOCUMENTS

| | | | |
|---|---|---|---|
| 2,827,379 | 3/1958 | Phelan | 99/403 |
| 3,938,948 | 2/1976 | Moore et al. | 431/347 |
| 3,948,593 | 4/1976 | Moore et al. | 431/8 |
| 4,289,477 | 9/1981 | Moore et al. | 431/171 |
| 4,397,299 | 8/1983 | Taylor et al. | 126/391 |

FOREIGN PATENT DOCUMENTS 2570942   4/1986   France ..................... 99/403

*Primary Examiner*—Carroll B. Dority
*Attorney, Agent, or Firm*—Robin, Blecker & Daley

[57] ABSTRACT

A deep-frying apparatus includes an oil tank for holding cooking oil in which food is fried. The oil tank includes sloping walls. Burners positioned outside of the oil tank heat the sloping walls. Shield plates are positioned inside the oil tank, substantially parallel to and spaced from the sloping walls, to shield the sloping walls from food debris. The shield plates are detachably mounted in the tank and have vents formed in the shield plates. The shield plates are coated with fluorine compounds and may be automatically vibrated by a vibration device. The apparatus prevents accumulation of food debris on the heated sloping walls of the oil tank.

12 Claims, 5 Drawing Sheets

DEEP-FRYING APPARATUS WITH FOOD DEBRIS SHIELD

FIELD OF THE INVENTION

This invention is concerned with industrial frying equipment, and more particularly with deep frying equipment in which an oil tank, filled with cooking oil, is directly heated by a heating device.

BACKGROUND OF THE INVENTION

In conventional industrial frying equipment, fried food (such as fried potatoes) is prepared using cooking oil contained in an oil tank heated by a burner outside the tank. In a typical arrangement, the burner directly heats sloping walls that form a portion of the walls of the oil tank. A metal screen is placed above the sloping wall portion of the tank and a basket in which the food is held and cooked is supported by the metal screen.

In using conventional deep fryers, unwanted food debris is often formed as the food (e.g., potatoes) is being cooked. The food debris falls onto the sloping walls of the oil tank and tends to stick to the sloping walls and harden into solid carbon because of the very high temperature to which the sloping walls are heated by the burner. The presence of the carbonified food debris on the sloping walls tends to cause additional food debris to stick to the sloping walls. According to a further adverse condition often found in conventional apparatus, the high temperature in the vicinity of the sloping walls tends to increase the viscosity of the cooking oil, which increases the likelihood that food debris floating in the cooking oil may stick to the sloping walls of the oil tank.

Once food debris has accumulated on the sloping walls, propagation of heat from the sloping walls to the cooking oil is impeded and the efficiency of the apparatus in heating the cooking oil is decreased. Consequently, the sloping walls tend to become overheated and the overheated condition of the sloping walls accelerates degradation of the cooking oil in the vicinity of the sloping walls.

Food debris which has been carbonified on the sloping walls is difficult to remove. The carbonified debris must be scrubbed off with a cleaning brush after the cooking oil has been discarded.

OBJECTS AND SUMMARY OF THE INVENTION

It is an object of the invention to provide deep-frying apparatus in which adhesion of fried food debris to the oil tank is reduced or prevented.

It is a further object of the invention to provide deep-frying apparatus in which premature deterioration of the cooking oil is prevented.

According to an aspect of the invention, there is provided a deep-frying apparatus including an oil tank for holding cooking oil in which food is fried, the oil tank including sloping walls, a heating device positioned outside of the oil tank for heating the sloping walls of the tank, and shield structure positioned inside of the oil tank, substantially parallel to and spaced from the sloping walls, for shielding the sloping walls from food debris.

According to further aspects of the invention, the shield structure may include a pair of metal shield plates, which may be detachably mounted in the oil tank. Preferably vents are formed in at least a portion of the shield plates, but possibly extending over substantially the entire surface of the shield plates. The shield plates may be coated with fluorine compounds and the apparatus may further include a vibration mechanism for imparting vibration to the shield plates.

The deep-frying apparatus of the present invention allows food debris to be guided into the bottom of the oil tank so as not to adhere to and accumulate and become carbonified on the sloping walls of the tank. Consequently, conduction of heat from the heated sloping walls into the cooking oil is not impeded by accumulated food debris and the useful life of each batch of cooking oil is extended. Food debris which may adhere to the shield plates is not likely to be carbonified because the shield plates are not as hot as the sloping walls of the oil tank. In addition, a channel formed between the shield plates and the sloping walls of the tank allows heated oil to rise therethrough, to form a convective flow in the cooking oil. As a result, relatively high-viscosity oil formed at the sloping walls is circulated to other parts of the tank, which also reduces the possibility that food debris floating in the cooking oil may adhere to the walls of the oil tank.

In consequence, the deep-frying equipment provided in accordance with the invention is easier to maintain, and need not be cleaned as frequently as conventional apparatus. Further, the cooking oil in the vicinity of the sloping walls of the oil tank is prevented from degrading due to overheating, because heat conduction through the sloping walls is not reduced by food debris so that the sloping walls are not caused to overheat.

The removability of the shield plates is another advantageous feature of an aspect of the present invention, since both the shield plates and the walls of the cooking oil tank can readily be cleaned. Also, since the shield plates are removable, the same can be removed for cleaning without discarding the cooking oil.

Slots or vents formed on some or all of the surface of the shield plates help to allow convection of the cooking oil in the vicinity of the sloping walls. In addition to preventing adhesion of food debris to the sloping walls of the oil tank, the convective flow of the oil also makes it less likely that the food debris will stick to the shield plates. The fluorine compound coating on the shield plates also reduces the likelihood that food debris will adhere to the shield plates. The vibration device referred to above helps to remove food debris which has adhered to the surface of the shield plates, which aids in cleaning the shield plates and may permit the plates to be cleaned without removing them from the oil tank.

DESCRIPTION OF PREFERRED EMBODIMENTS

Figure 1:
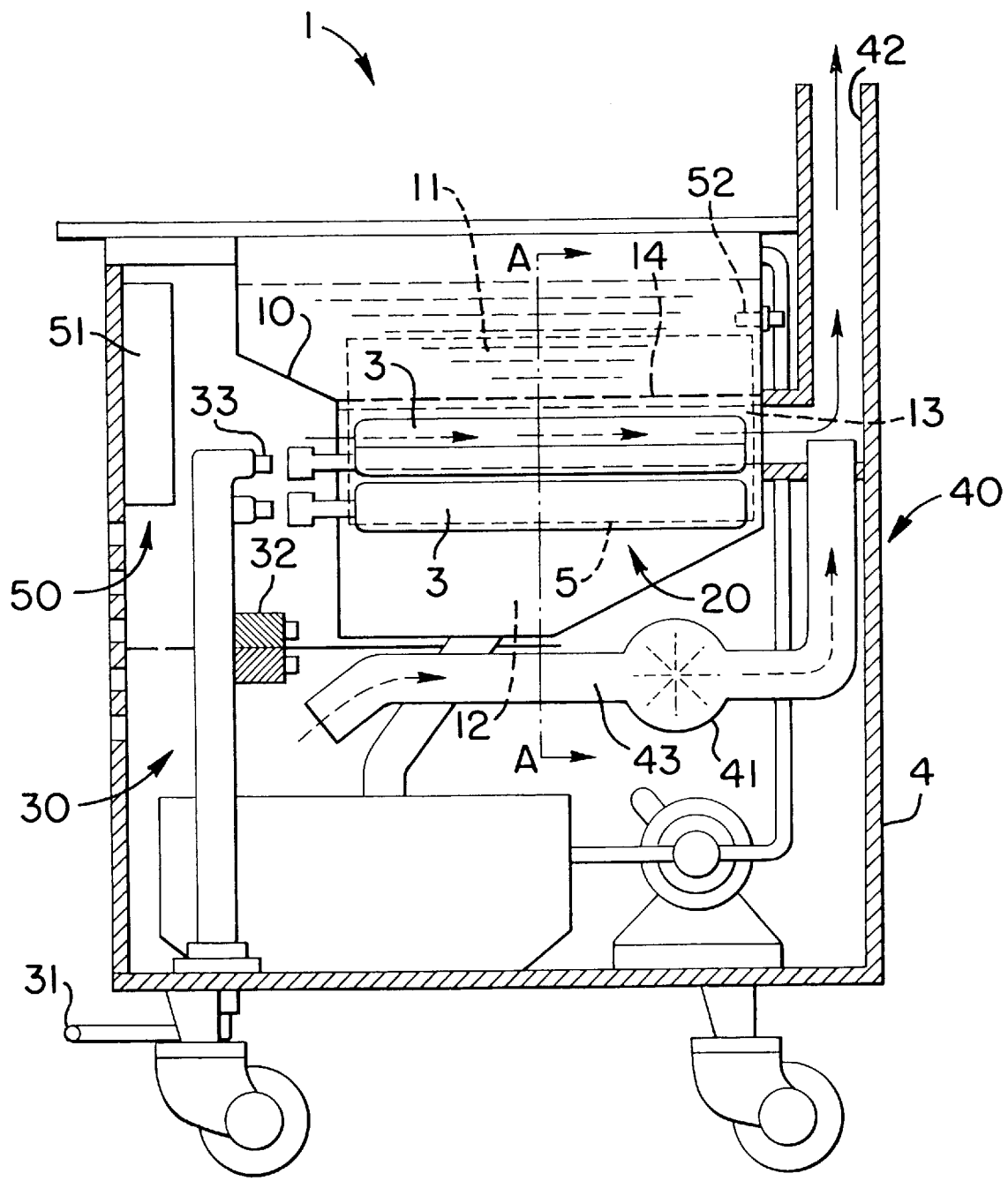
FIG. 1 is a cross-sectional side view of a frying apparatus provided in accordance with the invention.

An embodiment of the invention will now be described, initially with reference to FIG. 1. In FIG. 1, reference numeral 1 generally indicates a frying apparatus. The frying apparatus 1 includes an oil tank 10, a heating device 20, and a housing 4. The oil tank 10 is filled with cooking oil in which food is fried. The heating device 20 includes burners which heat the cooking oil contained in the oil tank 10. The oil tank 10 and heating device 20 are housed within the housing 4.

Figure 2:
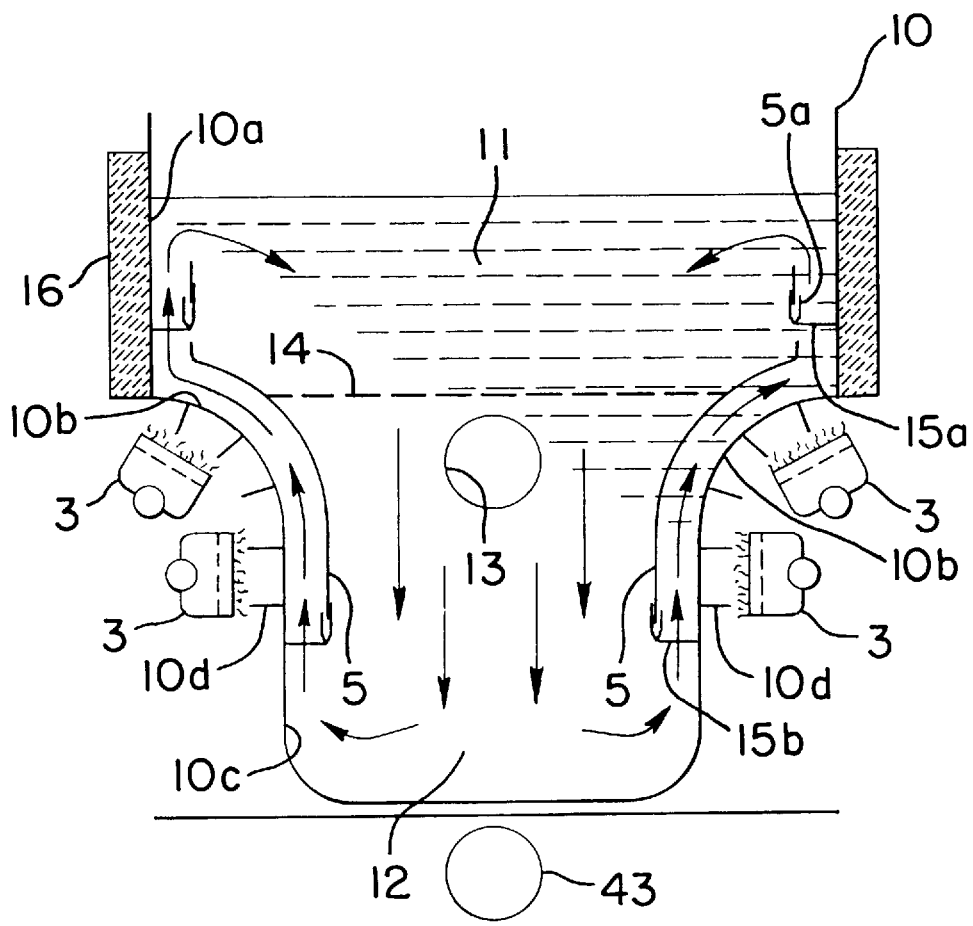
FIG. 2 is a front cross-sectional view, taken at a line A—A of FIG. 1, of an oil tank that is part of the frying apparatus of FIG. 1.

As seen from FIG. 2, right and left sides of the oil tank 10 include sloping walls 10b. The sloping walls gradually slope down toward the bottom of the oil tank. The oil tank 10 includes two zones, respectively indicated by reference numerals 11 and 12. The zone 11 is a cooking zone in which food is placed for cooking. The cooking zone 11 is above the sloped walls 10b and is defined at its lower limit by a screen 14. The zone 12 is considered to be in the portion of the tank below the sloping walls 10b, and the oil therein is lower in temperature than the oil in the upper portions of the oil tank 10. The zone 12 is sometimes referred to as a "cold zone". An exhaust passage 13 passes through the middle of the oil tank 10 in the direction from the front to the back of the oil tank. Several fins 10d are welded onto the outside of the sloping walls 10b. The fins 10d also run in the direction from the front to the back of the oil tank.

The left and right sides of the cooking zone 11 are defined by the upper side walls 10a. The left and right sides of the cold zone 12 are defined by the lower side walls 10c. A heat insulator 16 is attached to the outer surface of the upper side walls 10a. A respective shield plate 5 is provided at each of the left and right sides of the oil tank 10, and inside the oil tank. The shield plates 5 cover part of the upper walls 10a, part of the lower walls 10c, and substantially all of the sloping walls 10b. The shield plates 5 are spaced apart from and run substantially parallel to the above-mentioned parts of the walls of the oil tank. Preferably the shield plates 5 are formed of stainless steel, and the surface of the shield plates is coated with a fluorine compound. The fluorine compound suitable for this purpose may be, for example, poly tetra fluoro ethylene (PTFE), tetra fluoro ethylene—Per fluoro alkyl vinyl ether copolymer (PFA) or fluorinated ethylene-propylene copolymer (FEP).

Figure 3:
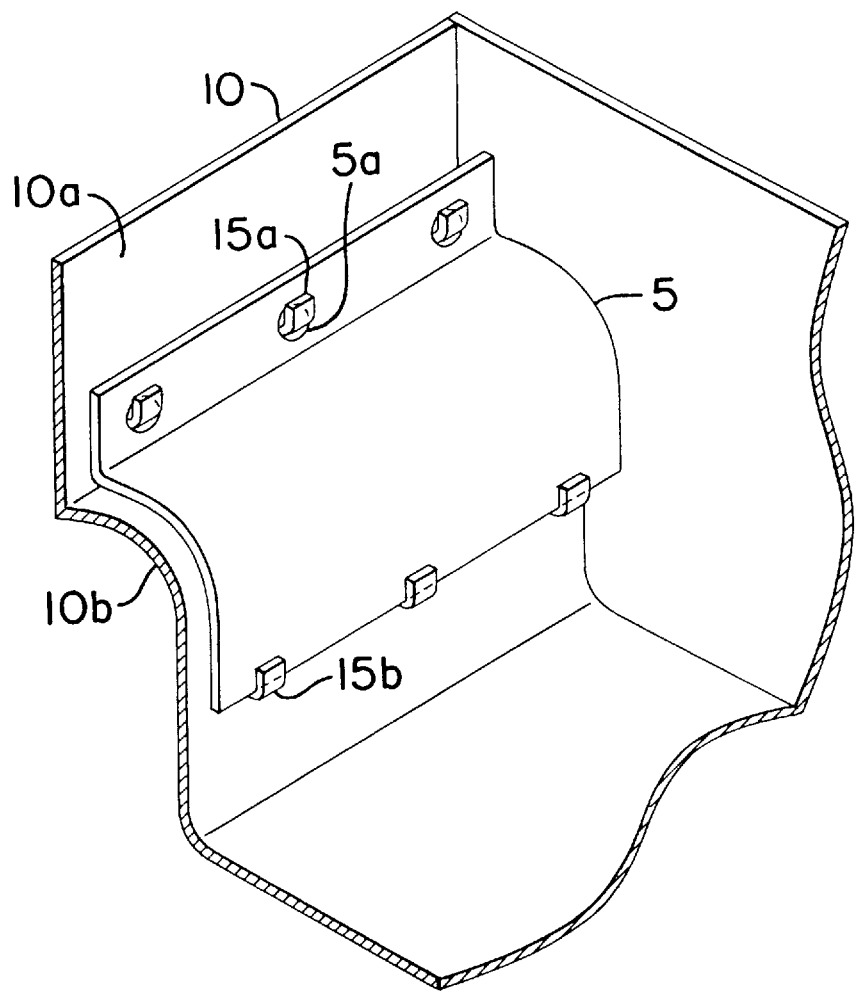
FIG. 3 is a partial view of the oil tank, showing a shield plate removably mounted in the oil tank.

As seen from FIG. 3, the shield plates 5 each have several small holes 5a near the top edge of the plate. Upper and lower rows of hooks 15a and 15b are provided on the side walls of the oil tank 10 for removably mounting the shield plates 5 on the oil tank walls. The lower row of hooks 15b supportingly engage the bottom edge of the respective shield plate 5. The upper row of hooks 15a are inserted through and engage the holes 5a of the respective shield plate 5. It can be seen that installation of the shield plate 5 in the oil tank 10 is quite a simple matter. The hooks 15a and 15b are arranged to maintain a predetermined distance between the shield plates 5 and the upper side walls 10a and sloping walls 10b of the oil tank. For cleaning, the shield plates 5 may readily be removed from the oil tank 10 by lifting the shield plates upward.

As seen from FIGS. 1 and 2, the heating device 20 includes burners 3, a gas supply section 30, an air supply section 40, and a flame control unit 50. The burners 3 are placed near the sloping walls 10b and operate to heat the sloping walls 10b. The gas supply section 30 supplies gas to the burners 3. The air supply section 40 supplies air to the burners 3. The flame control unit 50 controls the burners 3 and the temperature of the oil tank 10. The burners 3 are formed as a ceramic plate with rows of flame orifices. The burners 3 are of the totally primary air combustion system which produce a flame at the front surface of the ceramic plate. Upper burners and lower burners are positioned along each of the two sloping surfaces 10b.

The gas supply section 30 includes a gas inlet 31, electro-magnetic gas valves 32, and gas nozzles 33.

The gas inlet 31 is mounted at the bottom surface of the housing 4. The electro-magnetic gas valves 32 are located between the gas inlet 31 and the gas nozzles 33. The valves 32 selectively open and close a gas flow passage provided from the gas inlet 31 to the gas nozzles 33. The gas nozzles 33 are located at a point where the gas enters the burners 3. The nozzles 33 inject gas into the burners 3. The gas supply section 30 supplies the gas to the burners 3 and introduces primary air to feed the flame at the gaps between the nozzles 33 and the burners 3.

The air supply/exhaust section 40 includes an air supply pipe 43, a fan 41 and an exhaust pipe 42. The air supply pipe 43 is mounted below the oil tank 10. The fan 41 directs air into and out of the air supply pipe 43. The exhaust pipe 42 runs upward at the rear of the housing 4. Air flow provided by the fan 41 pulls exhaust from the burners 3 into the exhaust pipe 42 and then out of the frying apparatus. Air supplied to the air supply pipe 43 and the burners 3 passes through the front surface of the apparatus into the housing 4 via apertures in the housing 4.

The fan 41 of the air supply/exhaust 40 blows air into the exhaust pipe 42. The resulting flow of air cools the exhaust pipe 42 and prevents it from overheating. Moreover, this flow of air draws exhaust passing through the exhaust passage 13 into the exhaust pipe 42.

The burners 3 radiate heat to the sloping walls 10b and the fins 10d of the oil tank 10. Consequently, heat is transferred through the sloping walls 10b to the cooking oil in the oil tank 10. Part of the exhaust generated by the burners 3 enters into the exhaust pipe 42 at the right and left sides of the rear portion of the frying apparatus. The remainder of the exhaust from the burners 3 passes through the exhaust passage 13 (FIG. 2), which runs through the middle of the oil tank 10, and then the exhaust passing through the passage 13 enters the exhaust pipe 42. As a result, heat is transferred to the cooking oil from the exhaust passing through the passage 13, which improves the efficiency of the frying apparatus.

The flame control unit 50 includes a microprocessor controller 51, and a temperature sensor 52 mounted inside the oil tank 10. On the basis of signals provided by the temperature sensor 52, the flame control unit 50 selectively opens and closes the electro-magnetic gas valves 32 to switch the flame on and off, so that the temperature of the oil in the oil tank 10 is maintained within a certain range.

Cooking is performed in the frying apparatus 1 when cooking oil contained in the oil tank 10 is heated and a basket of food (such as slices of potatoes) is immersed in the oil in the cooking zone 11. Heat radiated from the burners 3 is applied to the sloping walls 10b and the fins 10d, and is transmitted to the cooking oil to raise the temperature of the cooking oil in the vicinity of the sloping walls 10b. As indicated by the arrows shown in FIG. 2, the heated cooking oil rises along the sloping walls 10b to reach the cooking zone 11. At the same time, lower temperature cooking oil in the cold zone 12 moves upwardly toward the sloping walls 10b. The cooking oil in the middle of the cooking zone 11 moves downwardly toward the cold zone 12, so that a convective flow is formed in the cooking oil. The relatively hot cooking oil in the cooking zone 12 causes the food to be cooked. After a certain period of time, the cooking process is completed.

As cooking takes place, food debris generated in the cooking zone 11 falls through the basket (not shown) and the screen 14. Because the sloping walls 10b of the oil tank are covered by the shield plates 5, the food debris does not fall onto the sloping walls 10b, but rather is guided down toward the lowest portion of the cold zone 12. The food debris is therefore prevented from coming into contact with the sloping walls 10b, which are the hottest portion of the oil tank 10. Moreover, the food debris is prevented from accumulating or being carbonified at the sloping walls 10b.

The food debris which falls into the bottom of the cold zone 12 remains in the oil tank 10, but is not carbonified because the temperature of the oil in the cold zone 12 is relatively low. Consequently, the cooking oil does not suffer from degradation which might occur if carbonified food debris were present in the oil tank.

Furthermore, the convective flow in the cooking oil prevents the highly viscous cooking oil formed at the sloping walls 10b from remaining near the sloping walls 10b. It is therefore less likely that small particles of food debris will stick to the sloping walls 10b, although small debris particles tend to float in the cooking oil rather than sinking to the bottom of the tank. Because the sloping walls 10b remain unimpeded, thermal conduction from the sloping 10b remains high and the sloping walls 10b do not overheat, which also helps to prevent the cooking oil from degrading prematurely. The cost of operating the apparatus is reduced because the cooking oil need not be changed as frequently as in conventional apparatus.

Moreover, the shield plates 5 are coated with fluorine compounds, and are maintained at a lower temperature than the sloping walls 10b of the oil tank. It is therefore relatively unlikely that food debris will stick to the shield plates 5, and the food debris therefore readily falls down to the bottom of the cold zone 12. Even if food sticks to the shield plates 5, it is unlikely to be carbonified because of the relatively low temperature at which the shield plates 5 are maintained. Also, even if some food debris does adhere to the shield plates 5, the shield plates 5 can easily be removed for cleaning since mounting and removal of the shield plates 5 is a simple operation.

Figure 4:
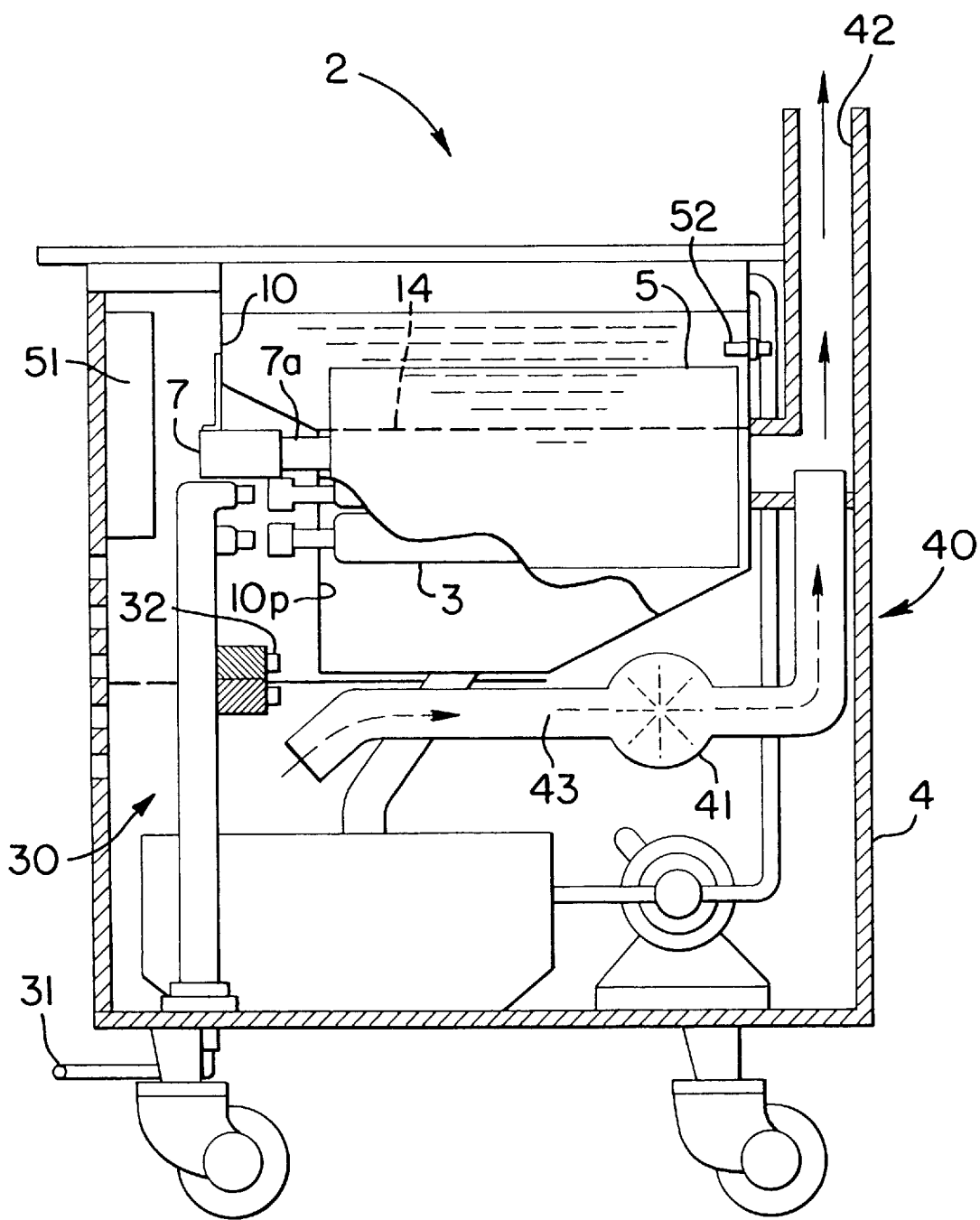
FIG. 4 is a cross-sectional view, similar to FIG. 1, of a frying apparatus according to an alternative embodiment of the invention.

A second embodiment of the invention will now be described with reference to FIG. 4. In FIG. 4, reference numeral 2 generally indicates the frying apparatus of the second embodiment. The frying apparatus 2 differs from that of FIG. 1 in that the apparatus 2 includes a vibration device 7 connected to the shield plates 5. Food debris which sticks to the surface of the shield plates 5 is easily removed as the result of vibration generated by the vibration device 7. Except for the inclusion of the vibration device 7, the apparatus 2 is the same as the frying apparatus previously described. Components of the second apparatus which have previously been described in connection with the first embodiment will not again be described.

The vibration device 7 is primarily formed of electromagnetic vibrators. The vibrators are connected to the shield plates 5 via vibration couplers 7a, which pass through the front surface 10p of the oil tank 10. The vibration couplers 7a contain an o-ring used as a seal. When the vibration device 7 is operated, the electro-magnetic vibrators cause the shield plates 5 to vibrate. As a result, food debris adhering to the surface of the shield plates 5 is caused to be lifted off the plates 5 and then falls down to the bottom of the oil tank.

In the frying apparatus 2 of FIG. 4, food debris which adheres to the surface of the shield plates 5 can be removed by operating the vibration device 7, which makes it unnecessary to take the shield plates 5 out of the oil tank 10. This makes it easier to clean the shield plates 5, and indeed, the frying apparatus 2 can be cleaned without turning off the apparatus. Since the frying apparatus 2 can be used continuously, even during cleaning, ease of operation of the frying apparatus is enhanced.

Figure 5:
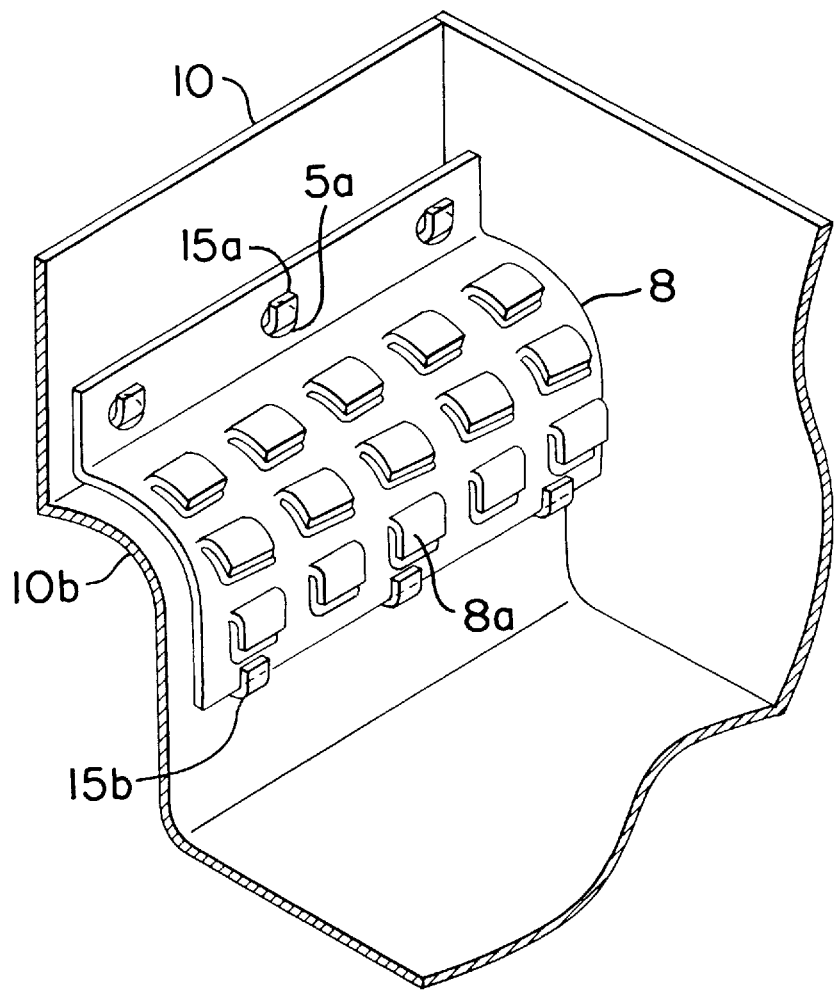
FIG. 5 is a view, similar to FIG. 3, showing a shield plate in which slots are formed.

Referring now to FIG. 5, a modified version of the shield plates is indicated at reference numeral 8. The modified shield plates 8 include rows of vents 8a, which are arranged over substantially the entire surface of the shield plates 8. Each of the vents 8a is in the form of a square having three sides and edges punched out from the plate 8 and a fourth side of the square bent so as to space the cut-out square from the plate 8. It is seen that the cut-out squares cover corresponding square holes in the shield plate. Part of the convective flow of the cooking oil in the oil tank passes through the vents 8a of the shield plates 8. This further reduces the likelihood that food debris may adhere to the surface of the shield plates 8.

Various modifications of the above-described embodiments are contemplated. For example, although it is preferred that the shield plates be coated with fluorine compounds, it is also contemplated to omit the fluorine compound coating.

Further, although vents 8a, if provided, are preferably formed over substantially the entire surface of the modified shield plates 8, it is contemplated that only a portion of the surface of the shield plates 8 may have vents. For example, only the middle row of the three rows of vents shown in FIG. 5 may be included. Such a partially-vented shield plate is advantageous in that it can be cleaned easily, while allowing part of the convective flow of cooking oil to pass through the shield plate.

As previously pointed out, in the frying apparatus described herein food debris is prevented from adhering to the surface of the shield plates and is not likely to be carbonified. Moreover, cooking oil in the apparatus of the present invention does not become degraded prematurely. The apparatus is easier to use than conventional apparatus since the cooking oil does not have to be changed as often as in conventional apparatus. The shield plates provided in accordance with the invention can be easily removed for cleaning from the oil tank, and once removed can be readily cleaned. Also, the shield plates can be cleaned without discarding the cooking oil. The slots provided according to certain embodiments of the invention further reduce the likelihood that food debris may adhere to the shield plates, while also making it less likely that the debris will adhere to the sloping walls of the oil tank. Further, the convective flow of the cooking oil is enhanced by the slots to prevent adhesion of debris to the sloping walls and the shield plates and to prevent carbonification of the debris. Adhesion of food debris to the shield plates is made still less likely because the shield plates are coated with fluorine compounds. This means that the shield plates do not need to be cleaned as frequently as might otherwise be the case.

Finally, the provision of a vibration mechanism to vibrate the shield plates allows food debris to be removed from the shield plates automatically, and without scrubbing. This reduces the amount of labor required to maintain the apparatus.

It will be recognized that further modifications may be made to the foregoing embodiments without departing from the invention. The particularly preferred embodiments disclosed herein are thus intended in an illustrative and not limiting sense. The true spirit and scope of the invention is set forth in the following claims.

What is claimed is:

1. A deep-frying apparatus, comprising:

an oil tank for holding cooking oil in which food is fried, said oil tank including sloping walls;

heating means positioned outside of said oil tank for heating said sloping walls; and shield means positioned inside said oil tank, substantially parallel to and spaced from said sloping walls, for shielding said sloping walls from food debris.

2. An apparatus according to claim 1, wherein said shield means includes a pair of metal shield plates.

3. An apparatus according to claim 2, wherein said shield plates are detachably mounted in said oil tank.

4. An apparatus according to claim 3, wherein vents are formed in at least a portion of each of said shield plates.

5. An apparatus according to claim 4, wherein said vents are provided in a pattern which extends over substantially an entire surface of said shield plates.

6. An apparatus according to claim 5, wherein said shield plates are coated with a fluorine compound.

7. An apparatus according to claim 6, further comprising vibration means for imparting vibration to said shield plates.

8. An apparatus according to claim 2, wherein said shield plates are coated with a fluorine compound.

9. An apparatus according to claim 2, wherein vents are formed in at least a portion of each of said shield plates.

10. An apparatus according to claim 9, wherein said vents are provided in a pattern which extends over substantially an entire surface of said shield plates.

11. An apparatus according to claim 1, further comprising vibration means for imparting vibration to said shield means.

12. An apparatus according to claim 11, wherein said shield means includes a pair of metal shield plates.

* * * * *